(12) United States Patent
Wei et al.

(10) Patent No.: US 12,224,633 B2
(45) Date of Patent: Feb. 11, 2025

(54) AUXILIARY DEVICE FOR INSERTING MAGNETS INTO A CASING

(71) Applicant: HENGDIAN GROUP INNUOVO ELECTRIC CO., LTD., Dongyang (CN)

(72) Inventors: Zhonghua Wei, Dongyang (CN); Kedi Shan, Dongyang (CN); Junjian Lu, Dongyang (CN); Jianhua Chen, Dongyang (CN); Hangdong Tang, Dongyang (CN)

(73) Assignee: HENGDIAN GROUP INNUOVO ELECTRIC CO., LTD., Dongyang (CN)

( * ) Notice: Subject to any disclaimer, the term of this patent is extended or adjusted under 35 U.S.C. 154(b) by 433 days.

(21) Appl. No.: 17/637,046

(22) PCT Filed: Sep. 22, 2020

(86) PCT No.: PCT/CN2020/116641
§ 371 (c)(1),
(2) Date: Feb. 21, 2022

(87) PCT Pub. No.: WO2021/253663
PCT Pub. Date: Dec. 23, 2021

(65) Prior Publication Data
US 2022/0302803 A1    Sep. 22, 2022

(30) Foreign Application Priority Data

Aug. 4, 2020  (CN) .......................... 202010774048.3

(51) Int. Cl.
*H02K 15/03*        (2006.01)
(52) U.S. Cl.
CPC .................................. *H02K 15/03* (2013.01)

(58) Field of Classification Search
CPC ............................... H02K 15/03; H02K 15/02
See application file for complete search history.

(56) References Cited

U.S. PATENT DOCUMENTS 9,150,358 B2 * 10/2015 Oda ...................... H01F 7/0221
9,467,015 B2 * 10/2016 Langford ............... H02K 15/03
(Continued)

FOREIGN PATENT DOCUMENTS

CN          202260906 U   *   5/2012
CN          104742413 A   *   7/2015
(Continued)

*Primary Examiner* — Jeffrey T Carley
*Assistant Examiner* — Jose K Abraham
(74) *Attorney, Agent, or Firm* — Jiwen Chen; Joywin IP Law PLLC

(57) ABSTRACT

A auxiliary device for bonding a casing and magnets, comprising a press (10) and a housing positioning seat (2), the press (10) including a press block (12). A vertically arranged raising and lowering rod (3) is provided below the press block (12), the raising and lowering rod (3) being supported on the housing positioning seat (2) by means of an elastic piece. A plurality of push plates (4) are provided on the circumferential side of the raising and lowering rod (3), the push plates (4) being slidingly mated on the housing positioning seat (2) along the radial direction of the raising and lowering rod (3). The raising and lowering rod (3) moves up and down in order to cause the push plates (4) to move in the radial direction of the raising and lowering rod (3), and the sides of the push plates (4) away from the raising and lowering rod (3) are provided with contact faces used to make contact with magnets. The press block (12) is provided with a first pressing part (121) used to exert force on the raising and lowering rod (3), and a second pressing part (122) used to exert force on the magnets located on the side of the push plates (4). The housing and the auxiliary magnet bonding device feature the strength of being able to maintain (Continued)

the position the magnets were in when they were bonded in order to prevent the fixing position of the magnets from deviating from a set position, in order to improve the mounting precision of the magnets, facilitating fixing between the magnets and the housing.

9 Claims, 3 Drawing Sheets

(56) References Cited

U.S. PATENT DOCUMENTS

| | | | | |
|---|---|---|---|---|
| 2005/0246886 A1* | 11/2005 | Morel | ............... | H02K 15/03 |
| | | | | 29/598 |
| 2010/0164316 A1* | 7/2010 | Langford | ............ | H02K 1/2795 |
| | | | | 29/598 |
| 2011/0162199 A1* | 7/2011 | Johnson | ................ | H02K 15/03 |
| | | | | 335/284 |
| 2015/0060235 A1* | 3/2015 | Oda | ..................... | H01F 7/0221 |
| | | | | 198/470.1 |
| 2019/0386529 A1 | 12/2019 | Nose et al. | | |
| 2020/0099278 A1* | 3/2020 | Fukuyama | ........ | B29C 45/14467 |

FOREIGN PATENT DOCUMENTS

| | | | | | |
|---|---|---|---|---|---|
| CN | 106253603 | A | * | 12/2016 | ............. H02K 15/03 |
| CN | 206759267 | | | 12/2017 | |
| CN | 207382149 | | | 5/2018 | |
| CN | 207559815 | | | 6/2018 | |
| CN | 108616202 | A | * | 10/2018 | ............. H02K 15/03 |
| CN | 109279336 | A | * | 1/2019 | ............. B65G 43/08 |
| CN | 109586529 | A | * | 4/2019 | |
| CN | 110649772 | | | 1/2020 | |
| CN | 110829753 | | | 2/2020 | |
| CN | 211018587 | | | 7/2020 | |
| CN | 211759668 | U | * | 10/2020 | |
| JP | 2003319621 | | | 11/2003 | |
| KR | 20170003343 | A | * | 1/2017 | |

* cited by examiner

AUXILIARY DEVICE FOR INSERTING MAGNETS INTO A CASING

This is a U.S. national stage application of PCT Application No. PCT/CN2020/116641 under 35 U.S.C. 371, filed Sep. 22, 2020 in Chinese, claiming priority to Chinese Patent Applications No. 202010774048.3, filed Aug. 4, 2020, all of which are hereby incorporated by reference.

TECHNICAL FIELD OF THE INVENTION

The present invention relates to the field of motor assembly, in particular to an auxiliary device for bonding a casing and magnets.

BACKGROUND OF THE INVENTION

Chinese Patent Application No. 201911043305.X discloses a magnet pressing fixture in a stator assembly, which moves a first clamping block and a second clamping block by rotating an adjusting screw to press magnets against an inner wall of a casing, so as to bond the casing and the magnets together.

Motors long in the axial length are provided with at least two layers of magnets in the axial direction in a casing thereof, but the adjacent two layers of magnets cannot fit together well due to polar repulsions between the two layers, resulting in a deviation between a fixed position and a preset position of the magnets.

SUMMARY OF THE INVENTION

An object of the present invention is to provide an auxiliary device for bonding a casing and magnets, which can hold magnets in right positions and fix the magnets to the casing, so as to avoid a deviation between a fixed position and a preset position of the magnets.

A technical solution employed in the present invention to achieve the above object is as follows: an auxiliary device for bonding a casing and magnets is provided, comprising a press and casing positioning bases, wherein the press comprises clamping blocks, a lifting rod, having several ejector plates on its circumferential side, is vertically disposed under each clamping block and propped against each casing positioning base by an elastic element, and the ejector plates are in sliding fit to the casing positioning base in the radial direction of the lifting rod; the lifting rod moves up and down to drive the ejector plates to move in the radial direction of the lifting rod, a contact surface, which is configured to contact with the magnet, is disposed on one side of the ejector plate away from the lifting rod, and each clamping block is provided with a first pressing portion configured to exert pressure on the lifting rod, and a second pressing portion configured to exert pressure on the magnet on the side of the ejector plate.

During use of the device according to the present invention, at least two layers of magnets are put on the casing positioning base, and the casing is also put on the casing positioning base. In this case, the magnets are located between the contact surface of the ejector plate and the inner wall of the casing, the press is started up, and the clamping blocks move down to drive the lifting rods to move down accordingly, so that the ejector plates move towards the inner wall of the casing, the magnets are pressed tightly between the contact surface of the ejector plate and the inner wall of the casing and between the clamping block and the casing positioning base to limit the vertical movement of the magnets, thus avoiding the upward deflection of the magnets on an upper layer caused by the repulsive force of the magnets on a lower layer. The present invention has the advantages of holding the magnets in right positions in the bonding process, so as to avoid a deviation between a fixed position and a preset position of the magnets, improve the mounting accuracy of the magnets, and fix the magnets to the casing more easily.

Preferably, at least two spacers, between which each ejector plate is located, are disposed on the circumferential side of the lifting rod and fixed to the casing positioning base. All the magnets are put between two adjacent spacers, and the spacers in the present invention are configured to limit the movement of the magnets in the circumferential direction of the casing.

Preferably, linkage blocks, with upper ends rotatably fixed to the lifting rod and lower ends rotatably fixed to the ejector plate, are connected between the lifting rod and the ejector plate; when lifting rod moves down, the upper ends of the linkage blocks move down while the lower ends thereof move away from the lifting rod in the radial direction of the lifting rod. Such arrangement allows the horizontal movement of the ejector plates.

In the present invention, the lifting rod moves up and down to drive the ejector plates to move in the radial direction of the lifting rod. Compared with the way of moving a first clamping block and a second clamping block by rotating an adjusting screw as mentioned herein, the lifting rod moves up and down more easily, and there are fewer components connected between the lifting rod and the ejector plate, so that the force transmission efficiency is higher and the service life is longer. The length of the linkage block is designed based on the stroke of the ejector plate, so that when the ejector plate moves to a limit position, the linkage blocks are not put flatwise, or a connecting end of each linkage block and each lifting rod is not located at a lower side of the connecting end of the linkage block and the ejector plate.

Preferably, each casing positioning base comprises a carrier plate which is provided with guide ways through which the lower ends of the ejector plates run, and the guide way is disposed in the radial direction of the lifting rod; upper rollers located on an upper side of the carrier plate, as well as lower rollers located on a lower side of the carrier plate, are fixed to the ejector plates, a circumferential surface of each upper roller is in contact with an upper end face of the carrier plate, and a circumferential surface of each lower roller is in contact with a lower end face of the carrier plate. In the present invention, the friction between the ejector plate and the casing positioning base is not sliding friction, but rolling friction, which requires less force to move the ejector plates and moves the ejector plates more easily.

Preferably, an axis of the upper roller is closer to an axis of the lifting rod than that of the lower roller.

Due to the errors in production and machining, it is difficult to keep all linkage blocks in the same shape and size, and to ensure no deviation in the positions of holes on the lifting rod and the ejector plate to hinge with the linkage blocks. In the present invention, the axis of the upper rollers is not located right above that of the lower rollers, so when the ejector plates move, the lower ends of the ejector plates can swing around the axis of the upper rollers, and the upper ends of the ejector plates can swing around the axis of the lower roller, thereby avoiding the ejector plates from being stuck in the casing positioning base. At the same time, when the lifting rod moves down, the upper rollers will be subjected to a downward force to avoid the lower rollers from being pressed against the lower end face of the carrier plate. When the lifting rod moves up, the lower rollers will be subjected to an upward force to avoid the upper rollers from being pressed against the upper end face of the carrier plate, thus avoiding the tilt of the axes of the upper and lower rollers as far as possible, and prolonging the service life of the upper and lower rollers.

Preferably, both the upper roller and the lower roller are bearings, two fixed shafts, to which the upper rollers and the lower rollers are respectively fixed, are transversely fixed to the ejector plate, and one upper roller and one lower roller are respectively disposed on opposite sides of each ejector plate. Both the upper roller and the lower roller are bearings, which can allow less friction generated when the ejector plates move, and less pressure on the lifting rod when the lifting rod is press down.

Preferably, each ejector plate consists of an ejector plate body and a fixed block, a hold-down groove is vertically formed on an end face on one side of the ejector plate body close to the lifting rod, and an end face on one side of the ejector plate body away from the lifting rod is the contact face; the fixed block comprises interconnecting pieces close to the lifting rod and fixing pieces away from the lifting rod, and both the fixing pieces and the interconnecting pieces are plate-shaped and fixed in the hold-down groove; the linkage blocks are rotatably fixed to the interconnecting pieces, and the fixed block is fixed to the ejector plate body so that the interconnecting pieces are in contact with the ejector plate body; and a recess groove is laterally disposed at a position of the contact surface corresponding to a joint between the upper and lower adjacent magnets.

Each ejector plate consists of the ejector plate body and the fixed block to facilitate machining the ejector plate. The hold-down groove is provided to keep the fixed block disposed vertically to avoid the tilt of the ejector plates. The recess groove is configured to receive glue that overflows between the two adjacent layers of magnets to avoid bonding the magnets with the ejector plates.

Preferably, the lifting rod is sleeved outside of a fixed rod, and the elastic element is sleeved outside of the fixed rod and located between the casing positioning base and the lifting rod.

Preferably, an adjusting block is fixed to an upper end of the lifting rod, a lower end of the adjusting block and the upper end of the lifting rod are of thread structures fitted to each other, and the clamping block moves down to drive the first pressing portion to be in contact with the adjusting block; the first pressing portion extending downward is disposed in the middle of the clamping block, and a lower end face of the first pressing portion is sunken in the middle to form a recess for receiving the adjusting block. The height position of an upper end face of the adjusting block may be adjusted by rotating the threads of the adjusting block, so as to adjust the lifting stroke of the lifting rod.

Preferably, the press comprises vertically disposed expansion links having a pressure plate transversely disposed at lower ends thereof, and the several clamping blocks, each having one casing positioning base disposed on a lower side, are fixed to a lower side of the pressure plate and are spaced and fixed from side to side on a movable plate, and the movable plate is provided with a translation drive mechanism configured to drive the movable plate to move back and forth. With the above arrangement, the device in the present invention can simultaneously assemble the casings with the magnets of a plurality of motors to improve the production efficiency. The translation drive mechanism is configured to enable the casing positioning bases depart from the clamping blocks, so as to avoid putting the workers' hands under the clamping blocks and the pressure plate, and to reduce the possibility of safety accidents.

The present invention has the advantages of holding the magnets in right positions in the bonding process, so as to avoid a deviation between a fixed position and a preset position of the magnets, improve the mounting accuracy of the magnets, and fix the magnets to the casing more easily.

DETAILED DESCRIPTION OF THE EMBODIMENTS OF THE INVENTION

The present invention will be further described as below with reference to the accompanying drawings by specific embodiments.

Figure 1:
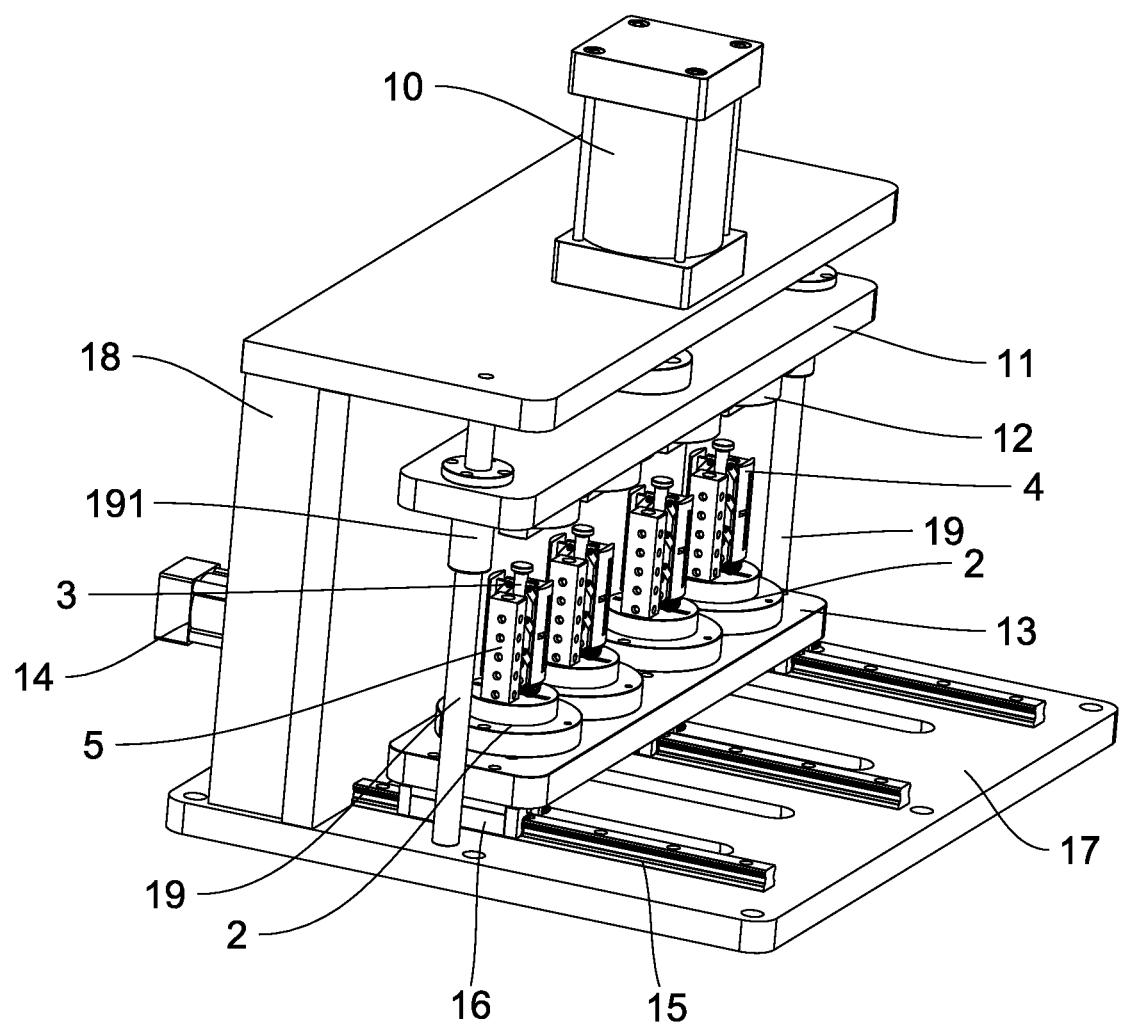
FIG. 1 is a structural diagram according to the present invention.
Figure 2:
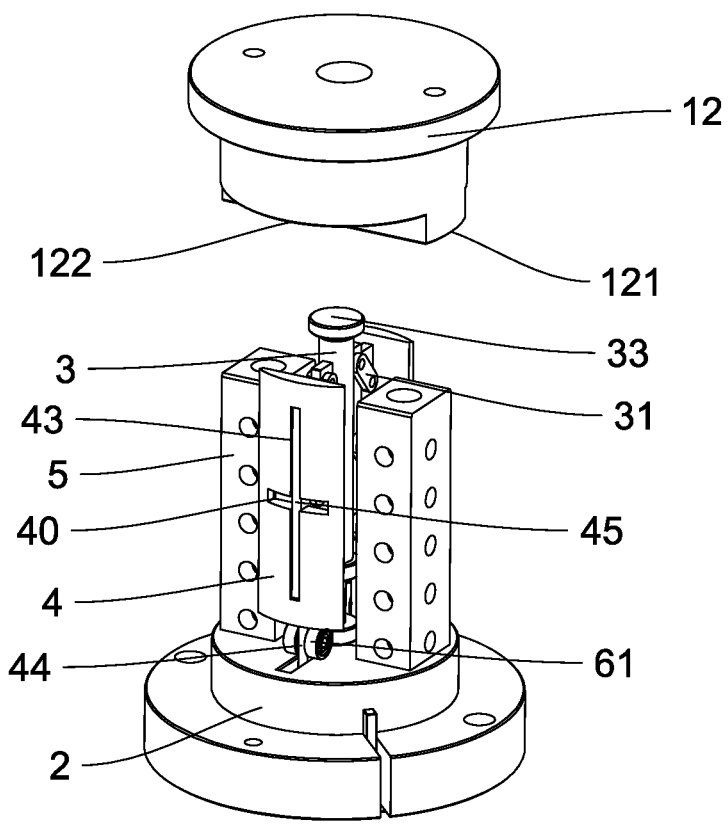
FIG. 2 is a structural diagram of a casing positioning base and a clamping block according to the present invention.
Figure 3:
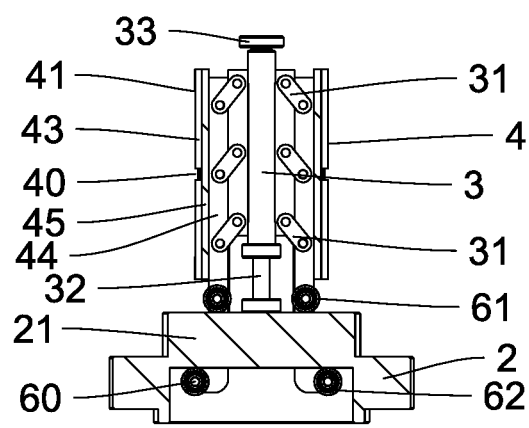
FIG. 3 is a sectional view according to the present invention.
Figure 4:
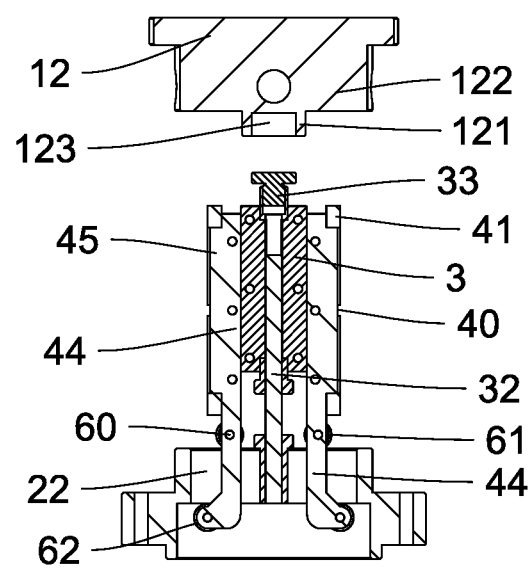
FIG. 4 is another sectional view according to the present invention.

As shown in FIGS. 1 to 4, an auxiliary device for bonding a casing and magnets is provided according to the present invention, including a press 10 and casing positioning bases 2. The press 10 includes vertically disposed expansion links having a pressure plate 11 transversely disposed at lower ends thereof, and several clamping blocks 12, each having one casing positioning base 2 disposed on a lower side, are fixed to a lower side of the pressure plate 11, the several casing positioning bases 2 are spaced and fixed from side to side on a movable plate 13, and the movable plate 13 is provided with a translation drive mechanism configured to drive the movable plate 13 to move back and forth. The press 10 is a cylinder press, and the translation drive mechanism includes a linear cylinder 14, slide ways 15 and sliders 16. The slide ways 15 are disposed in a longitudinal direction, and the sliders 16 are in sliding fit to the slide ways 15 and fixed on a lower side of the movable plate 13. The slide ways 15 are fixed to a bottom plate 17, the press 10 is fixed to the bottom plate 17 through a bracket 18, and guide rods 19 are connected between the bracket 18 and the bottom plate 17, and a guide sleeve 191, to which the pressure plate 11 is fixed, is in sliding fit outside of each guide rod 19.

A lifting rod 3, having two ejector plates 4 on its circumferential side, is vertically propped against each casing positioning base 2 by an elastic element (not shown), and the ejector plates 4 are in sliding fit to the casing positioning base 2 in the radial direction of the lifting rod 3. The lifting rod 3 moves up and down to drive the ejector plates 4 to move in the radial direction of the lifting rod 3, a contact surface, which is in the same arc shape as an inner surface of a magnet and configured to contact with the magnet, is disposed on one side of the ejector plate away from the lifting rod 3, and each clamping block 12 is provided with a first pressing portion 121 configured to exert pressure on the lifting rod 3, and a second pressing portion 122 configured to exert pressure on the magnet on the side of the ejector plate 4. Two spacers 5, between which each ejector plate 4 is located, are disposed on the circumferential side of the lifting rod 3 and fixed to the casing positioning base 2.

A recess groove 40 is laterally disposed at a position of the contact surface corresponding to a joint between the upper and lower adjacent magnets.

Linkage blocks 31, with upper ends rotatably fixed to the lifting rod 3 and lower ends rotatably fixed to the ejector plate 4, are connected between the lifting rod 3 and the ejector plate 4. When lifting rod 3 moves down, the upper ends of the linkage blocks 31 move down while the lower ends thereof move away from the lifting rod 3 in the radial direction of the lifting rod 3.

Each casing positioning base 2 includes a carrier plate 21 which is provided with guide ways 22 through which the lower ends of the ejector plates 4 run, and the guide way 22 is disposed in the radial direction of the lifting rod 3. Upper rollers 61 located on an upper side of the carrier plate 21, as well as lower rollers 62 located on a lower side of the carrier plate, are fixed to the ejector plates 4, a circumferential surface of each upper roller 61 is in contact with an upper end face of the carrier plate 21, and a circumferential surface of each lower roller 62 is in contact with a lower end face of the carrier plate. An axis of the upper roller 61 is closer to an axis of the lifting rod 3 than that of the lower roller 62, and both the upper roller 61 and the lower roller 62 are bearings. Two fixed shafts 60, to which the upper rollers 61 and the lower rollers 62 are respectively fixed, are transversely fixed to the ejector plate 4, and one upper roller 61 and one lower roller 62 are respectively disposed on opposite sides of each ejector plate 4.

Each ejector plate 4 consists of an ejector plate body 41 and a fixed block, a hold-down groove 43 is vertically formed on an end face on one side of the ejector plate body 41 close to the lifting rod 3, and an end face on one side of the ejector plate body 41 away from the lifting rod 3 is the contact face. The fixed block includes interconnecting pieces 44 close to the lifting rod 3 and fixing pieces 45 away from the lifting rod 3, and both the fixing pieces 45 and the interconnecting pieces 44 are plate-shaped. The lower ends of the linkage blocks 31 are rotatably fixed to the interconnecting pieces 44. The fixed block is fixed to the ejector plate body 41 so that the fixing pieces 45 are fixed in the hold-down groove 43 and the interconnecting pieces 44 are pressed against the ejector plate body 41. Both the upper rollers 61 and the lower rollers 62 are fixed to the interconnecting pieces 44.

The lifting rod 3 is sleeved outside of a fixed rod 32, and the elastic element is sleeved outside of the fixed rod 32 and located between the casing positioning base 2 and the lifting rod 3. An adjusting block 33 is fixed to an upper end of the lifting rod 3, a lower end of the adjusting block 33 and the upper end of the lifting rod 3 are of thread structures fitted to each other, and the clamping block 12 moves down to drive the first pressing portion 121 to be in contact with the adjusting block 33. The first pressing portion 121 extending downward is disposed in the middle of the clamping block 12, and a lower end face of the first pressing portion 121 is sunken in the middle to form a recess 123 for receiving the adjusting block 33.

The auxiliary device for bonding a casing and magnets according to the present invention serves as an aid for bonding the double-layer magnets and the casing, and the magnet on each layer consist of two magnetic tiles.

During use of the device according to the present invention, two layers of magnets are put on the casing positioning base, and the casing is also put on the casing positioning base and sleeved outside of the magnets. In this case, the magnets are located between the contact surface of the ejector plate and the inner wall of the casing, the linear cylinder of the translation drive mechanism is activated to drive the casing positioning base to move to a position under the clamping blocks, the press is started up, and the clamping blocks move down to drive the lifting rods to move down accordingly, so that the ejector plates move towards the inner wall of the casing, the magnets are pressed tightly between the contact surface of the ejector plate and the inner wall of the casing and between the clamping block and the casing positioning base, and confined between the two spacers. After the magnets are kept pressed for a period of time, the press is reset so that the clamping blocks are reset. Workers can use the translation drive mechanism to drive the casing positioning base to move forward and deviate from the press, and finally take the casing away.

The present invention has the advantages of holding the magnets in right positions in the bonding process, so as to avoid a deviation between a fixed position and a preset position of the magnets, improve the mounting accuracy of the magnets, and fix the magnets to the casing more easily.

The invention claimed is:

1. An auxiliary device for inserting magnets into a casing, comprising a press and casing positioning bases, wherein the press comprises clamping blocks, a lifting rod, having several ejector plates on its circumferential side, is vertically disposed under each clamping block and propped against each casing positioning base by an elastic element, and the ejector plates are in sliding fit to the casing positioning base in the radial direction of the lifting rod; the lifting rod moves up and down to drive the ejector plates to move in the radial direction of the lifting rod, a contact surface, which is configured to contact with the magnet, is disposed on one side of the ejector plate away from the lifting rod, and each clamping block is provided with a first pressing portion configured to exert pressure on the lifting rod, and a second pressing portion configured to exert pressure on the magnet on the side of the ejector plate;

wherein linkage blocks, with upper ends rotatably fixed to the lifting rod and lower ends rotatably fixed to the ejector plate, are connected between the lifting rod and the ejector plate; when the lifting rod moves down, the upper ends of the linkage blocks move down while the lower ends thereof move away from the lifting rod in the radial direction of the lifting rod.

2. The auxiliary device according to claim 1, wherein the auxiliary device further comprises at least two spacers, between which each ejector plate is located, and wherein the spacers are disposed on the circumferential side of the lifting rod and are fixed to the casing positioning base.

3. The auxiliary device according to claim 1, wherein each casing positioning base comprises a carrier plate which is provided with guide ways through which the lower ends of the ejector plates run, and the guide way is disposed in the radial direction of the lifting rod; upper rollers located on an upper side of the carrier plate, as well as lower rollers located on a lower side of the carrier plate, are fixed to the ejector plates, a circumferential surface of each upper roller is in contact with an upper end face of the carrier plate, and a circumferential surface of each lower roller is in contact with a lower end face of the carrier plate.

4. The auxiliary device according to claim 3, wherein a distance between an axis of the upper roller to an axis of the lifting rod is closer than a distance between an axis of the lower roller to the axis of the lifting rod.

5. The auxiliary device according to claim 3, wherein both the upper roller and the lower roller are bearings, two fixed shafts, to which the upper rollers and the lower rollers are respectively fixed, are transversely fixed to the ejector plate, and one upper roller and one lower roller are respectively disposed on opposite sides of each ejector plate.

6. The auxiliary device according to claim 1, wherein each ejector plate consists of an ejector plate body and a fixed block, a hold-down groove is vertically formed on an end face on one side of the ejector plate body close to the lifting rod, and an end face on one side of the ejector plate body away from the lifting rod is the contact face; the fixed block comprises interconnecting pieces close to the lifting rod and fixing pieces away from the lifting rod, and both the fixing pieces and the interconnecting pieces are plate-shaped and fixed in the hold-down groove; the linkage blocks are rotatably fixed to the interconnecting pieces, and the fixed block is fixed to the ejector plate body so that the interconnecting pieces are in contact with the ejector plate body; and
  a recess groove is laterally disposed at a position of the contact surface corresponding to a joint between the upper and lower adjacent magnets.

7. The auxiliary device according to claim 1, wherein the lifting rod is sleeved outside of a fixed rod, and the elastic element is sleeved outside of the fixed rod and located between the casing positioning base and the lifting rod.

8. An auxiliary device for inserting magnets into a casing, comprising a press and casing positioning bases, wherein the press comprises clamping blocks, a lifting rod having several ejector plates on its circumferential side, is vertically disposed under each clamping block and propped against each casing positioning base by an elastic element, and the ejector plates are in sliding fit to the casing positioning base in the radial direction of the lifting rod; the lifting rod moves up and down to drive the ejector plates to move in the radial direction of the lifting rod, a contact surface, which is configured to contact with the magnet, is disposed on one side of the ejector plate away from the lifting rod, and each clamping block is provided with a first pressing portion configured to exert pressure on the lifting rod, and a second pressing portion configured to exert pressure on the magnet on the side of the ejector plate, wherein an adjusting block is fixed to an upper end of the lifting rod, a lower end of the adjusting block and the upper end of the lifting rod are of thread structures fitted to each other, and the clamping block moves down to drive the first pressing portion to be in contact with the adjusting block; the first pressing portion extending downward is disposed in the middle of the clamping block, and a lower end face of the first pressing portion is sunken in the middle to form a recess for receiving the adjusting block.

9. An auxiliary device for inserting magnets into a casing, comprising a press and casing positioning bases, wherein the press comprises clamping blocks, a lifting rod having several ejector plates on its circumferential side, is vertically disposed under each clamping block and propped against each casing positioning base by an elastic element, and the ejector plates are in sliding fit to the casing positioning base in the radial direction of the lifting rod; the lifting rod moves up and down to drive the ejector plates to move in the radial direction of the lifting rod, a contact surface, which is configured to contact with the magnet, is disposed on one side of the ejector plate away from the lifting rod, and each clamping block is provided with a first pressing portion configured to exert pressure on the lifting rod, and a second pressing portion configured to exert pressure on the magnet on the side of the ejector plate, wherein the press comprises vertically disposed expansion links having a pressure plate transversely disposed at lower ends thereof, and the several clamping blocks, each having one casing positioning base disposed on a lower side, are fixed to a lower side of the pressure plate and are spaced and fixed from side to side on a movable plate, and the movable plate is provided with a translation drive mechanism configured to drive the movable plate to move back and forth.

* * * * *